(12) United States Patent
Weissbrod

(10) Patent No.: US 8,746,608 B2
(45) Date of Patent: Jun. 10, 2014

(54) HOOK SLOT TO RETAIN A WIRE WITHIN A SPOOL

(75) Inventor: Paul A. Weissbrod, South Euclid, OH (US)

(73) Assignee: Lincoln Global, Inc., City of Industry, CA (US)

( * ) Notice: Subject to any disclaimer, the term of this patent is extended or adjusted under 35 U.S.C. 154(b) by 355 days.

(21) Appl. No.: 13/337,580

(22) Filed: Dec. 27, 2011

(65) Prior Publication Data

US 2013/0161430 A1    Jun. 27, 2013

(51) Int. Cl.
*B65H 65/00*    (2006.01)
*B65H 75/28*    (2006.01)

(52) U.S. Cl.
USPC .................. 242/476.6; 242/587.2; 242/125.1

(58) Field of Classification Search
USPC ................ 242/476.1, 476.6, 579, 587, 587.2, 242/587.3, 125, 125.1
See application file for complete search history.

(56) References Cited

U.S. PATENT DOCUMENTS

| 4,584,442 A | 4/1986 | Shields et al. |
| 4,880,182 A | 11/1989 | Gelfman |
| 5,967,455 A | 10/1999 | Farber |
| 6,065,709 A | 5/2000 | Wagter et al. |
| 7,487,932 B2 | 2/2009 | Ellis |

FOREIGN PATENT DOCUMENTS

| GB | 2263099 A | 7/1993 |
| JP | S56 160668 U | 11/1981 |
| JP | H05 193838 A | 8/1993 |
| JP | H05 77175 U | 10/1993 |

OTHER PUBLICATIONS

Industrial Winding Spool, http://www.indiamart.com/ms-engineernig-works/winding-spools.html, Dec. 16, 2011.
International Search Report for corresponding application PCT/IB2012/002798 dated May 23, 2013.
Written Opinion of ISA for corresponding application PCT/IB2012/002798 dated May 23, 2013.

*Primary Examiner* — William E Dondero
(74) *Attorney, Agent, or Firm* — Hahn Loeser & Parks LLP

(57) ABSTRACT

A wire spool is disclosed that includes an elongate barrel that has a first end and a second end that are separated by a wall with an inner surface and an outer surface. A key is disposed on the inner surface of the barrel, wherein a recess is created within the key. A hook slot is disposed within the outer surface of the barrel, the hook slot is located above the recess and receives a start end of a wire to provide insulation thereof. The hook slot also directs a length of wire to be wound out of the hook slot for placement against a spool flange.

17 Claims, 8 Drawing Sheets

HOOK SLOT TO RETAIN A WIRE WITHIN A SPOOL

TECHNICAL FIELD

The present disclosure is related to wire used with electric welding systems, and more particularly, to a hook slot within a spool that insulates a wire end from surrounding conductive surfaces.

BACKGROUND OF THE INVENTION

Wire used in electric weld systems is frequently stored on spools for continuous delivery for weld creation, wherein current is delivered via the wire to the workpiece to complete the weld circuit. As the wire is electrically live, contact with any conductive surfaces outside of the electric weld circuit (e.g., steel plates and structures) can cause shorting of said weld circuit, resulting in consequent damage to one or more components within the weld system and/or deleterious weld creation. The wire must be isolated electrically to prevent these short circuit events outside of the weld circuit from occurring, and this isolation must remain effective over the entire dispensing cycle of the wire on the spool. Many spool, spool mounting, and wire path control designs have been employed to achieve these goals.

Of particular interest is the inside end of the welding wire wound on a spool. This end must be isolated from short circuit events, and must be retained adequately in an isolated state over the entire dispensing cycle of the wire on the spool. As such, it must not be permitted to become detachedly released during the dispense cycle of the wire on the spool.

In one exemplary spool design, a hole is disposed completely through the barrel that allows seating a hook at the wire end through a slot into the spool core. In this conventional application, electrical isolation of the wire is achieved by constraining the hook end of the wire to a very narrow position within a keyway in the hub onto which the spool is installed. It is difficult to constrain movement of the hook end within this small window and thereby achieve electrical isolation. In addition, since the wire end has to be kept short to prevent short circuiting, the end can become detachedly released when the wire nears the end of spool, which is undesirable prior to completely consuming the wire. In one exemplary means to compensate for this shortcoming, more wire than that which is required for a weld cycle can be wound on the spool to insure there is sufficient wire remaining as a weld nears completion. This solution, however, results in unnecessary costs as the extra wire is generally scrapped at the conclusion of the weld.

SUMMARY OF THE INVENTION

In one aspect, a wire spool includes an elongate barrel having a longitudinal rotational axis, the barrel has a first end and a second end that are separated by a wall with an inner surface and an outer surface. A first flange is toroidally shaped and is substantially orthogonal to the longitudinal rotational axis, the first flange is disposed concentrically surrounding the first end of the barrel. A second flange is toroidally shaped and is substantially orthogonal to the longitudinal rotational axis, the second flange is disposed concentrically surrounding the second end of the barrel. A key is disposed on the inner surface of the barrel, the key is a rectangular prism that extends from the second flange toward the first flange along the longitudinal rotational axis. A recess creates a hole shaped as a rectangular prism within the key, the recess is smaller than the key. A hook slot is disposed within the outer surface of the barrel, the hook slot is located above the recess to receive a start end of a length of wire to be wound on the spool. The hook slot includes a straight segment that directs the start end into the recess in a first direction. A transition receives the length of wire to be wound and directs the wire to be wound approximately ninety degrees relative to the first direction. An exit pocket receives the continuation of the wire to be wound from the transition and directs the continuation of the wire to be wound out of the hook slot and against the second flange.

In another aspect, a spool is used to wind a wire, wherein the wire has a start end and a length of wire to be wound. An elongate barrel has a longitudinal rotational axis, the barrel has a first end and a second end that are separated by a wall with an inner surface and an outer surface. A first flange is toroidally shaped and is substantially orthogonal to the longitudinal rotational axis, the first flange is disposed concentrically surrounding the first end of the barrel. A second flange is toroidally shaped and is substantially orthogonal to the longitudinal rotational axis, the second flange is disposed concentrically surrounding the second end of the barrel. A key is disposed on the inner surface of the barrel, the key is a rectangular prism that extends from the second flange toward the first flange along the longitudinal rotational axis. The key has a key length along the longitudinal rotational axis. A recess creates a hole shaped as a rectangular prism within the key, the recess is smaller than the key, the recess has a recess length along the longitudinal rotational axis. A hook slot is disposed within the outer surface of the barrel, the hook slot is located above the recess to receive a start end of a length of wire to be wound on the spool, the recess and has a hook slot length along the longitudinal rotational axis. The hook slot includes a straight segment that directs the start end of the wire into the recess in a first direction. A transition receives the length of wire to be wound from the straight segment and directs the length of wire to be wound approximately ninety degrees relative to the first direction. An exit pocket receives the length of wire to be wound from the transition and directs the length of wire to be wound out of the hook slot and against the second flange, wherein the key length is greater than the recess length and wherein the recess length is greater than the hook slot length.

In yet another aspect, a hook slot is disposed within a barrel of a wire spool, the barrel has an exterior surface and an interior surface, the hook slot receives a start end of a length of wire to be wound on the wire spool. A recess is disposed between the exterior surface and the interior surface of the barrel. A straight segment directs the start end of the wire into the recess in a first direction. The straight segment includes a first straight segment sidewall and a second straight segment sidewall that is substantially parallel to the first straight segment sidewall. A floor is disposed between the first straight segment sidewall and the second straight segment sidewall. A void is disposed adjacent to the floor to mechanically couple the straight segment to the recess, wherein the start end of the wire is directed into the recess via the void. A transition receives the length of wire to be wound from the straight segment, the transition directs the length of wire to be wound approximately ninety degrees relative to the first direction. An exit pocket receives the length of wire to be wound from the transition and directs the length of wire to be wound out of the hook slot.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION OF THE INVENTION

Figure 1:
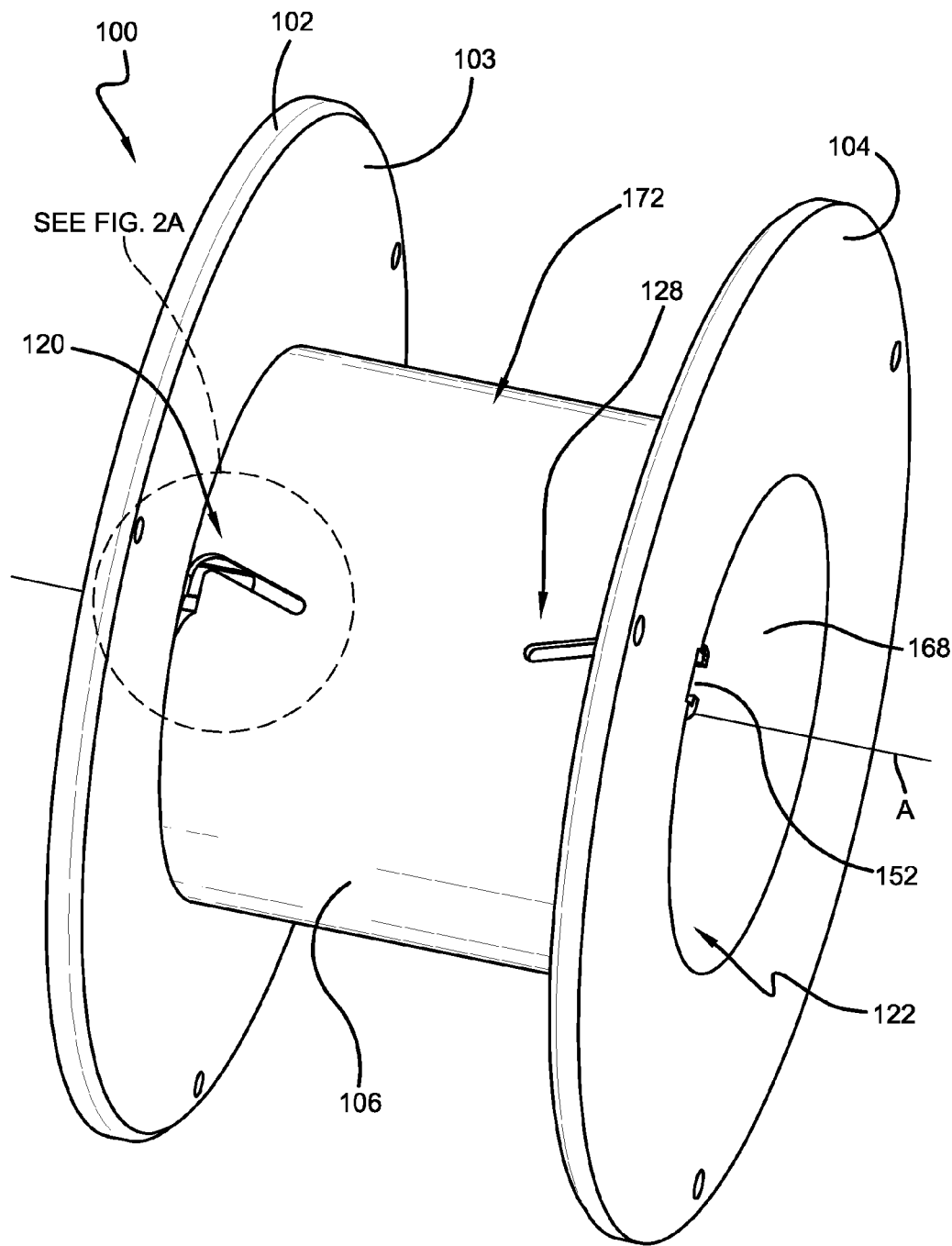
FIG. 1 is a perspective view of a spool that includes a first hook slot and a second hook slot, which are employed to retain a start end of a welding wire within a spool key.

Referring now to the figures, several embodiments or implementations of the present invention are hereinafter described in conjunction with the drawings, wherein like reference numerals are used to refer to like elements throughout. The present disclosure is related to a hook slot formed within a key on the barrel of a spool, wherein the hook slot insulates a wire end from surrounding surfaces. Although illustrated and described hereinafter in the context of various exemplary welding systems, the invention is not limited to the illustrated examples.

More particularly, the subject embodiments relate to a hook slot that is created to access a hollow recess of a key, which is created in the barrel of a wire spool. The hook slot serves as an insulated receptacle for the end of wire that is wound around the spool. The use of the subject hook slot embodiments yield a spool bore free of electrically hot wire, which can short on the hub to which the spool is mounted. In this manner, a spool of wire can be used in an electric welding system without shorting against adjacent conductive components. In an embodiment, the hook slot has a specially shaped slot that provides a means of feeding a end hook into the hollow recess in the key. In an example, a start end is directed into the recess in a first direction wherein a length of wire to be wound is bent approximately ninety degrees before exiting the hook slot. An exit pocket is configured to drive wire against the inside flange face to assist in an accurate and repeatable start for a precision layer winding process.

In yet another embodiment, the slot is shorter than the recess so that when fully seated, the end hook is entrapped and cannot accidentally spring free from the hollow recess. More particularly, the end hook is held into place via the transition and exit pocket of hook slot. Both structures are employed to hold the wire in place to counter forces applied when the end of the spool is near. These forces are applied as wire wound around spool has an inherent spring force that drives the wire to unwind from the spool. Such forces can increase as wire is paid out. Accordingly, the greatest amount of force is applied to the end of the wire when the least amount of resistive force is conventionally available. To mitigate this effect, the subject embodiments are designed to prevent the end hook from releasing from the hook slot even when shortened, thereby preventing the end from becoming detachedly released to avoid a short circuit condition. Accordingly, additional wire weight is unnecessary as the end hook is held into place via the hook slot as a weld nears completion.

Moreover, the subject embodiments insure that welding wire is properly anchored against an inside wall of a first spool flange to facilitate a precision winding operation. For this purpose, an exit pocket within the hook slot accurately places a first layer of wire on a spool facilitates proper placement for the balance of the wire wound onto the spool. First, the exit pocket facilitates a graduated exit of the wire from the hook slot via a ramp, which is aligned with the spring force of the wire. Second, as the wire moves up the ramp, the exit pocket is tapered to drive the wire against an inside wall of a spool flange. In this manner, a start end of the wire is captured within the spool and drawn therefrom to facilitate accurate placement onto the barrel of the spool. Accurate placement of the first layer can insure that wire is initially directly adjacent a first spool flange so that it will be subsequently wound in contact from turn to turn moving across the barrel thereby leaving about a one-half wire diameter gap on approach to a second spool flange. As subsequent layers are keyed off the first layer, accurate placement thereof aids in a precision winding operation for an entire length of wire onto a spool.

Referring now to the drawings wherein the showings are for the purpose of illustrating the exemplary embodiments, FIG. 1 is a perspective view of a spool 100 that is generally comprised of a cylindrical barrel 106 having at its ends a first flange 102 and a second flange 104 respectively, each having an inside and an outside face. In this embodiment, inside face 103 of the first flange 102 is shown. The flanges 102, 104 are designed to maintain a quantity of wire wound onto the barrel 106 from dismounting in either direction. A longitudinal rotational axis A of the barrel extends orthogonally from the faces defined by the inside surface of each flange. The inside surface of the barrel is referred to as a bore surface 168 and the exterior surface of the barrel is referred to as a winding surface 172. The space defined by the bore surface 168 is referred to herein as a bore 122.

Figure 3:
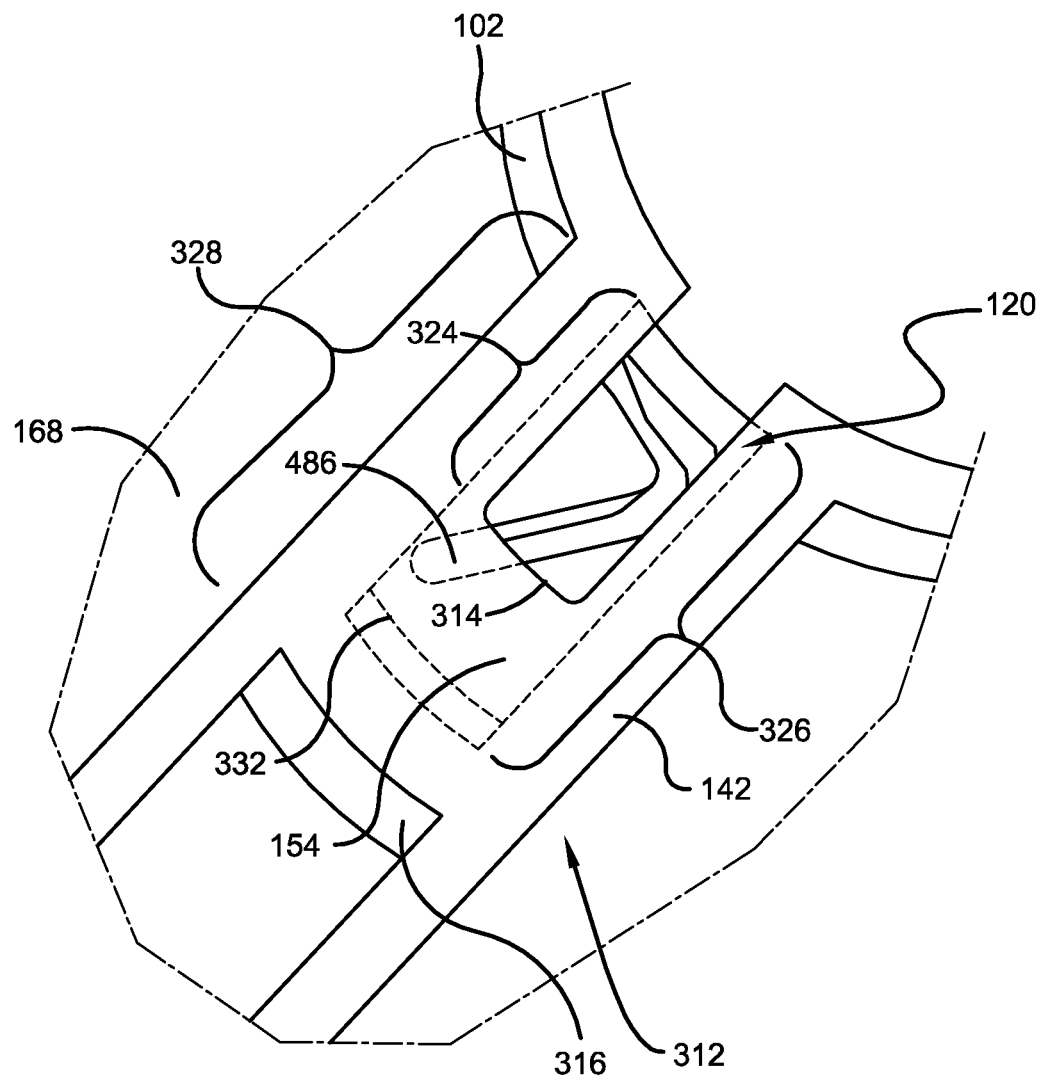
FIG. 3 is a perspective view of a spool that illustrates a spool key in relation to a recess and a hook slot.

A recess (not shown) may be created within a key (not shown in FIG. 1) located on the bore surface 168. In an embodiment, the key is a rectangular prism and extends from a plane defined by an outside face of the first flange 102 toward the second flange 104. In an embodiment, the key has a length of 0.5 to 8.0 inches; a width of 0.25 to 3.0 inches; and a height of 0.1 to 2.0 inches. The recess has dimensions which are smaller than the key and can be created via a milling, molding, extrusion, or other suitable process either during or subsequent to fabrication of the wire spool 100. Hook slots 120, 128 are disposed within the winding surface of the barrel 106 and are employed to capture and insulate a first end of a wire that is wound around the barrel. The hook slots 120, 128 are disposed at a location that is commensurate with the location of corresponding recesses disposed below each hook. In an embodiment, the length of the hook slots 120, 128 is less than the length of the corresponding recess, which in turn is less than the length of the corresponding weld key 142, as illustrated in FIG. 3. The hook slots 120, 128 can be molded, cut, or otherwise placed below the surface of a spool barrel.

In this configuration, a start end inserted into either hook slot 120, 128 can extend into the corresponding recess beyond the end of the hook lengths to ensure proper securement and insulation of the wire. For example, a start end of the wire can be bent orthogonally and placed into the recess from the hook slot in a first direction. For this purpose, a through hole or via can be created to couple the hook slot to the recess disposed beneath. A length of wire to be wound can be drawn out at ninety degrees from the first direction and secured in place by one or more structures within the hook slot. The first direction can be in a substantially sideways direction (e.g. toward the center of the barrel). In this manner, wire which is charged (e.g., for an electric weld operation) can be protected from shorting against a conductive surface outside of a weld circuit.

Figure 2:
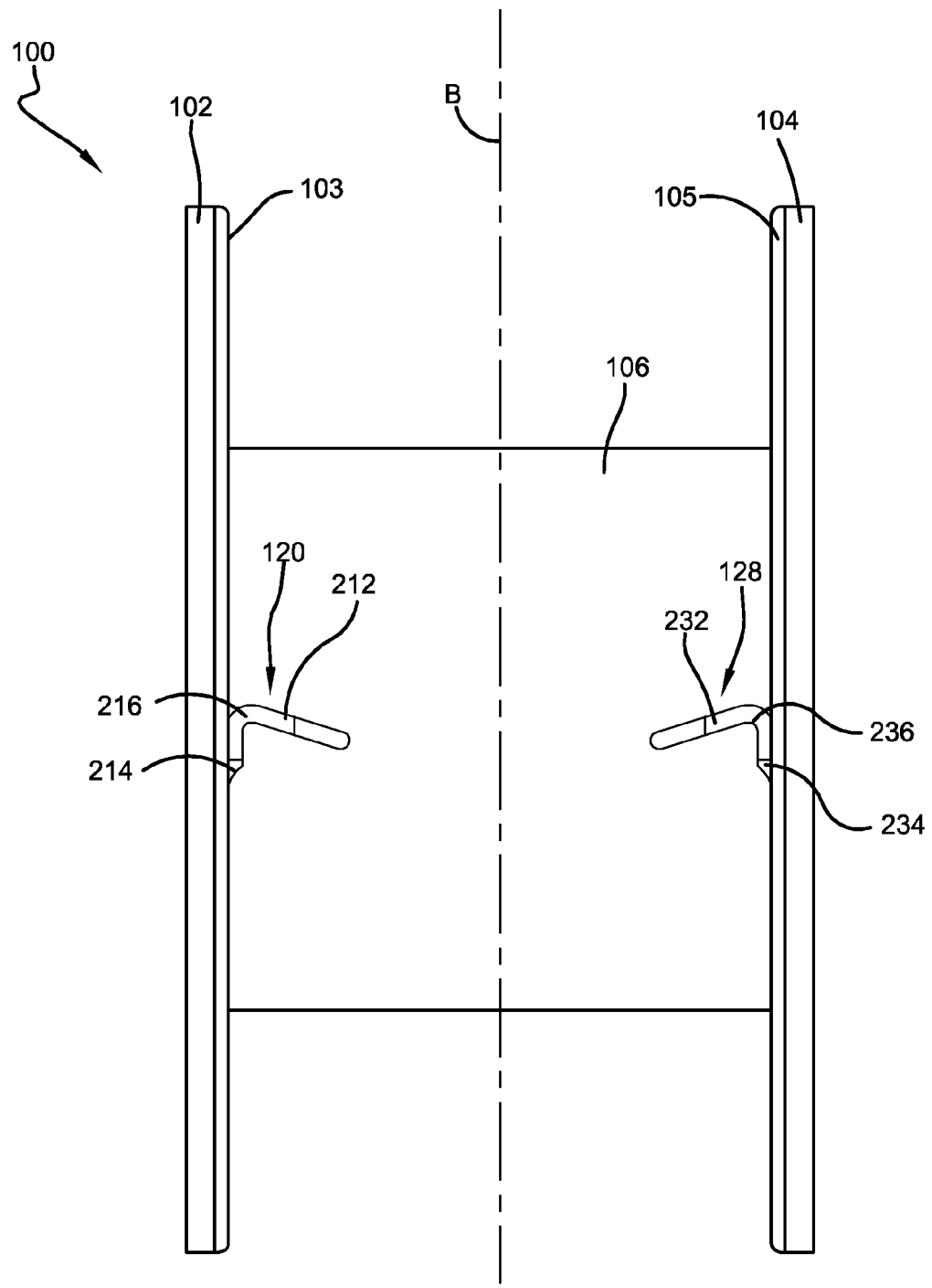
FIG. 2 is an elevation view of a spool that includes two hook slots employed to retain a start end of a welding wire within a spool key.

FIG. 2 is an elevation view of the wire spool 100 that illustrates the first hook slot 120 and the second hook slot 128 on the barrel. It is to be appreciated that only one of the hook slots 120, 128 may be implemented in practice. The first hook slot 120 includes a straight segment 212, an exit pocket 214, and a transition 216 disposed between the straight segment and the exit pocket. Similarly, the second hook slot 128 includes a straight segment 232, an exit pocket 234, and a transition 236 disposed therebetween. Straight segments 212, 232 have a width which is substantially the same or greater than a particular wire diameter utilized to wind around the spool 100. Each straight segment 212, 232 is coupled to the recesses (nor shown) disposed within the barrel wall. As the length of each recess is greater than the length of the straight segment from the inner wall of each flange, a start end is forced to reside at a location toward a centerline B which bisects the width of the barrel 106.

Transitions 216, 236 force a length of wire to be wound, opposite the start end of the wire, to be bent in a direction away from the direction of the straight segments 212, 232. For example, the start end can be bent downward whereas the length of wire to be wound is bent in a relatively sideway direction. Exit pockets 214, 234 receive the length of wire to be wound from the transition and direct the length of wire to be wound upward and against the inner wall of each respective flange 102, 104 as the length of wire to be wound exits the hook slot. For this purpose, exit pockets 214, 234 include tapered stepwise features to force the wire incrementally from the transition toward flanges 102, 104 respectively via an exit point. Such features create a ramp that gradually moves the wire out of the hook slot and onto the surface of the barrel that generally aligns with the spring force exerted by the wire. The length of wire to be wound is transitioned from the hook slots 120, 128 and against the inner wall of respective flanges to facilitate accurate and repeatable wire placement when winding wire onto the wire spool 100.

Figure 2A:
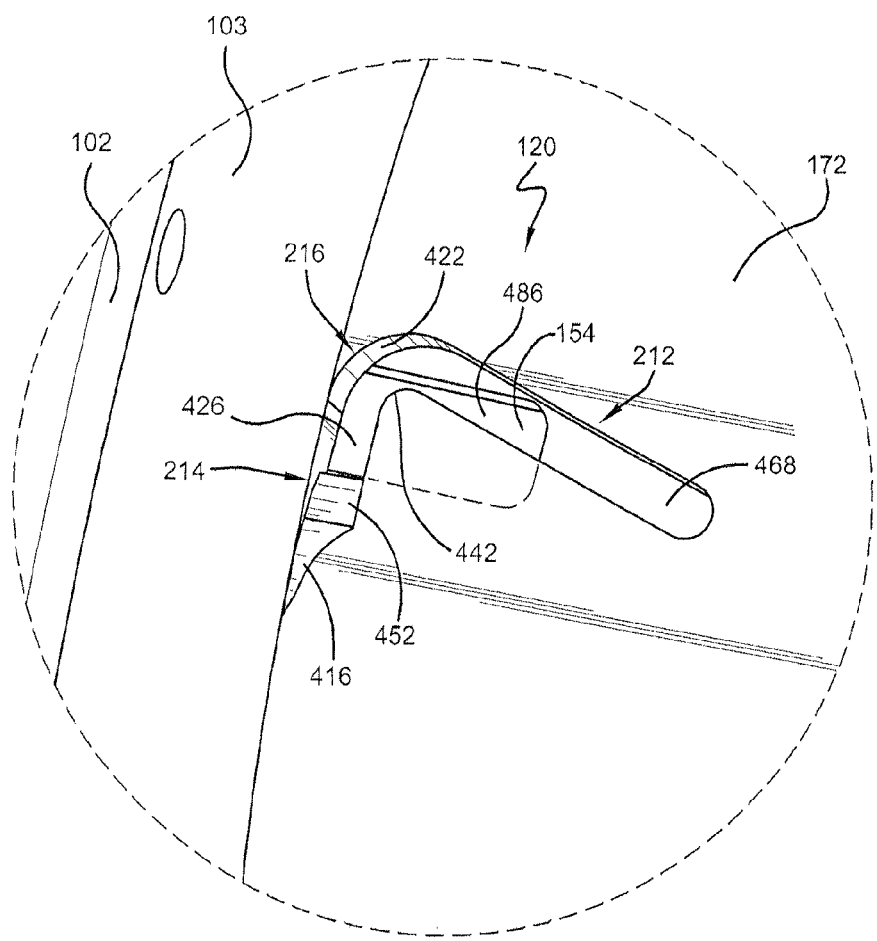
FIG. 2A is a detailed perspective view of the first hook slot to retain a start end of a welding wire within a spool key.

FIG. 2A is a detailed perspective view of hook slot 120, which is used to protect a start end of a wire from contact with a conductive surface. Hook slot 120 also allows a length of wire to be wound to exit against the inside face 103 as an accurate and repeatable start point to wind wire onto the spool. For this purpose, straight segment 212 includes floor 468 that extends to transition 216, which is defined by inner transition wall 442 and outer transition wall 422. Void 486, disposed adjacent floor 468, allows the start end of the wire to enter recess 154 when inserted into the hook slot 120. The transition, in turn, is coupled to exit pocket 214 to allow the length of wire to be wound to exit the hook slot against the inner face 103. The exit pocket 214 moves the wire upward to winding surface 172 via exit landing 452 and exit point 416, as discussed in greater detail below.

FIG. 3 is a left-side perspective view of the wire spool 100 that illustrates a spool key 312 that extends from the inner wall of the first flange 102 toward the centerline B. The spool key 312 can be used in a weld operation to secure the spool 100 to a hub (not shown) that rotates to payout the wire wound onto the spool for use in a weld operation. As the spool key 312 is a necessary mechanical feature, utilization of the volumetric footprint created thereby is advantageous. First, the size of the spool key 312 is generally much greater than the relative size of welding wire. Second, the spool key 312 and the wire spool 100 are rarely, if ever, constructed of material that is conductive. Therefore, the spool key and surfaces associated therewith, are insulated and can prevent electric conductivity between welding wire and one or more external conductive surfaces.

As shown, the spool key 312 has an end wall 316 that defines a key length 328 along the longitudinal rotational axis A. The recess has a recess length 326 along the longitudinal rotational axis A, wherein the recess length is less than the key length 328. The hook slot has a hook slot length 324 along the longitudinal rotational axis, wherein the hook slot length 324 is less than the recess length 326. In an embodiment, the hook slot length is defined by an end wall and the recess length is defined by an end wall 332, described above. In this configuration, wire which first enters the hook slot cavity has a wire end which is manipulated into the recess which extends beyond the hook slot length 324. In order to ensure that the wire does not extend outward into the core, the key length 328 has a distance which is greater than the recess length 326.

Figure 4:
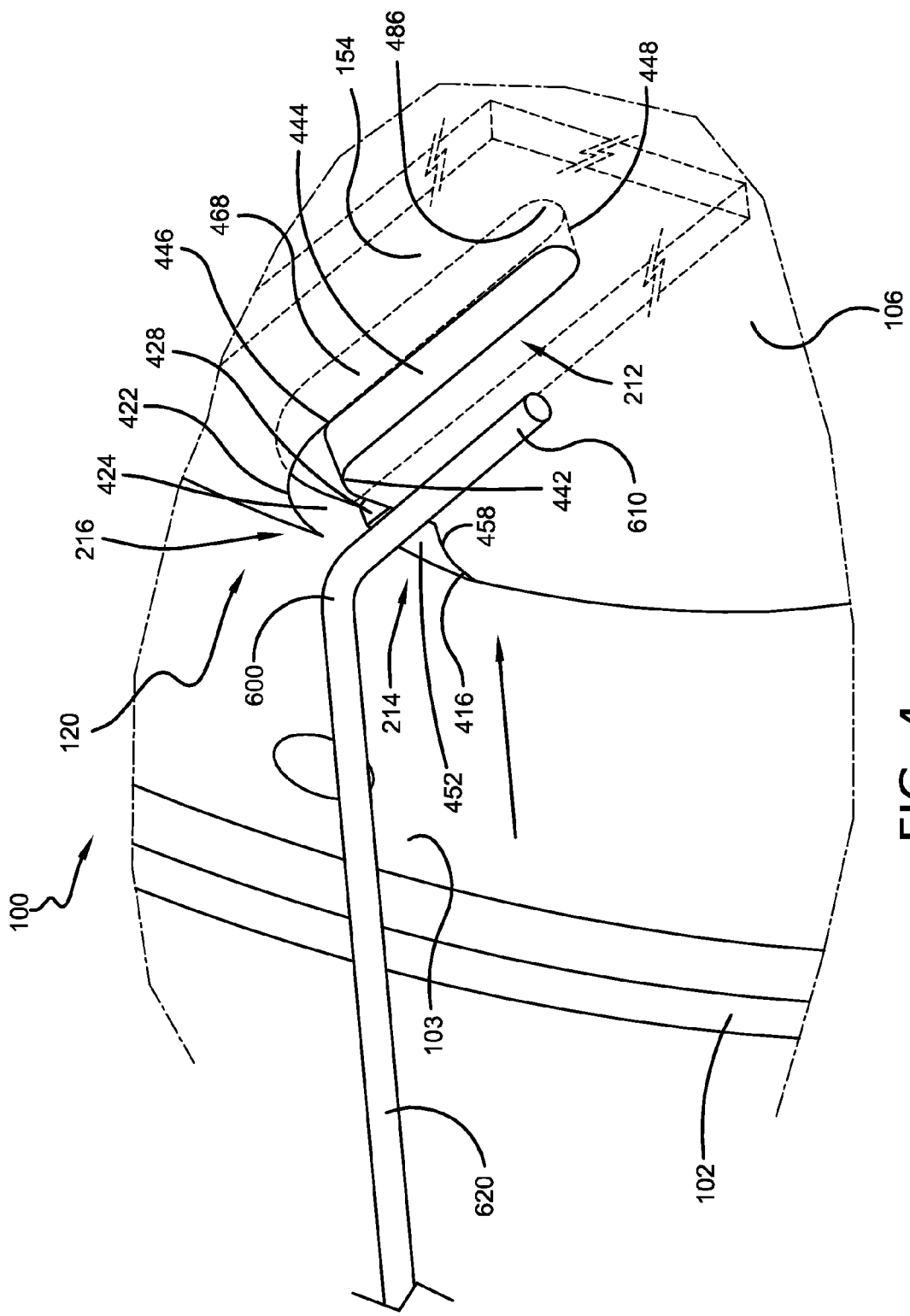
FIG. 4 is a perspective view of a hook slot employed to retain a start end of a welding wire within a spool key, which shows insertion of welding wire into the hook slot.

FIGS. 4-7 are perspective views to illustrate successive steps to place a wire 600 with a start end 610 and a length of wire to be wound 620 within first hook slot 120. FIG. 4 illustrates a first point in time, followed by FIG. 5, FIG. 6 and finally FIG. 7, where the wire is finally and fully placed within the hook slot 120. Besides wire placement, FIGS. 4-7 also illustrate different sections of the end hook to more clearly illustrate use thereof. As described herein, the first hook slot 120 includes straight segment 212, exit pocket 214, and transition 216 disposed between the straight segment 212 and the exit pocket 214. In an embodiment, the transition 216 includes an orthogonal pathway to force wire disposed within the hook slot 120 to bend approximately ninety degrees. In this manner, the wire 600 can be "locked" into place wherein it is prevented from being pulled out of the end hook.

Figure 5:
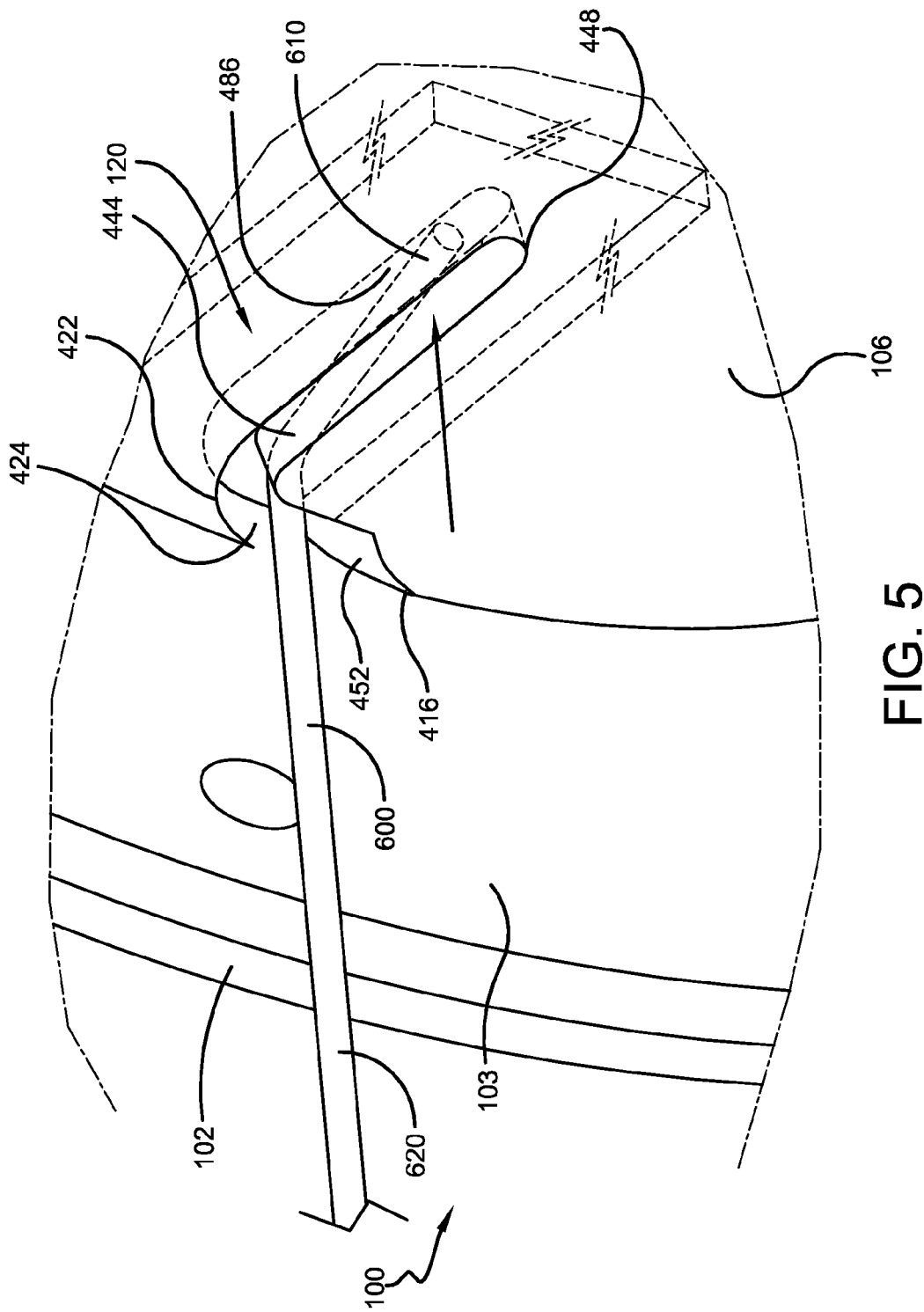
FIG. 5 is a perspective view of the hook slot employed to retain a start end of a welding wire within a spool key, which shows insertion of the welding wire following FIG. 4.
Figure 6:
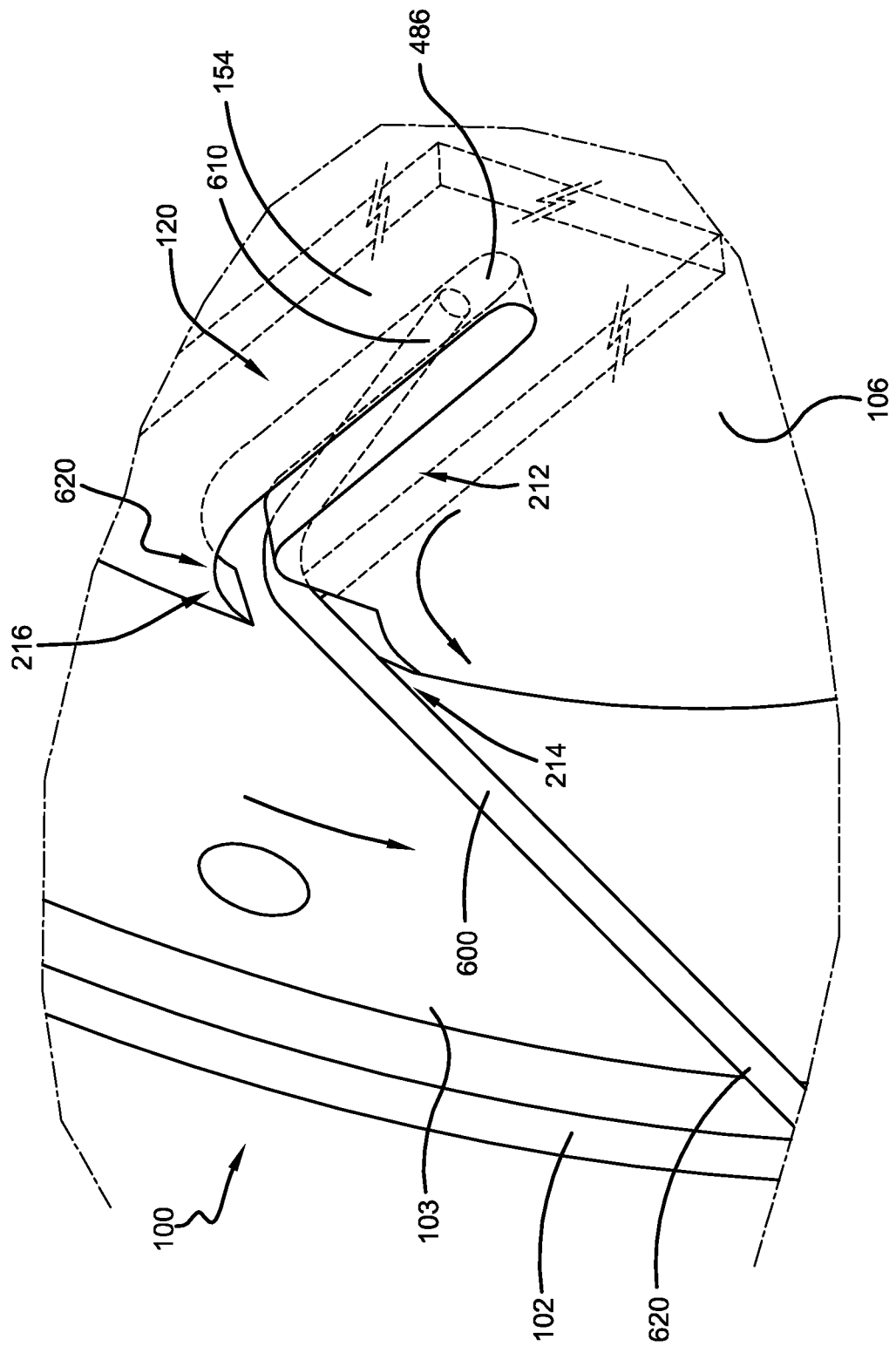
FIG. 6 is a perspective view of the hook slot employed to retain a start end of a welding wire within a spool key, which shows insertion of the welding wire following FIG. 5.

As shown in FIG. 4, the straight segment 212 is defined by a first straight segment wall 444 and a second straight segment wall 446 which extend from a floor 468 of the hook slot to the surface of the barrel 106. The floor 468 extends from the transition to a void 486, wherein the void 486 is disposed between the floor 468 and the end wall 448, as shown in FIGS. 5 and 6. In this manner, the start end 610 can be placed in contact with the floor 468 and directed downward through the void 486 into the recess 154 located below the floor 468. A straight segment end wall 448 couples the first and second straight segment sidewalls and is depicted as having an arcuate shape. It will be appreciated that the end wall 448, however, can have substantially any geometric shape that is suitable for the capture and securement of wire within the hook slot 120. As shown, the void 486 can have substantially any size and/or shape that is within the bounds of the key. In other embodiments, one or more sides of the void extend to the edge of the key size.

Figure 7:
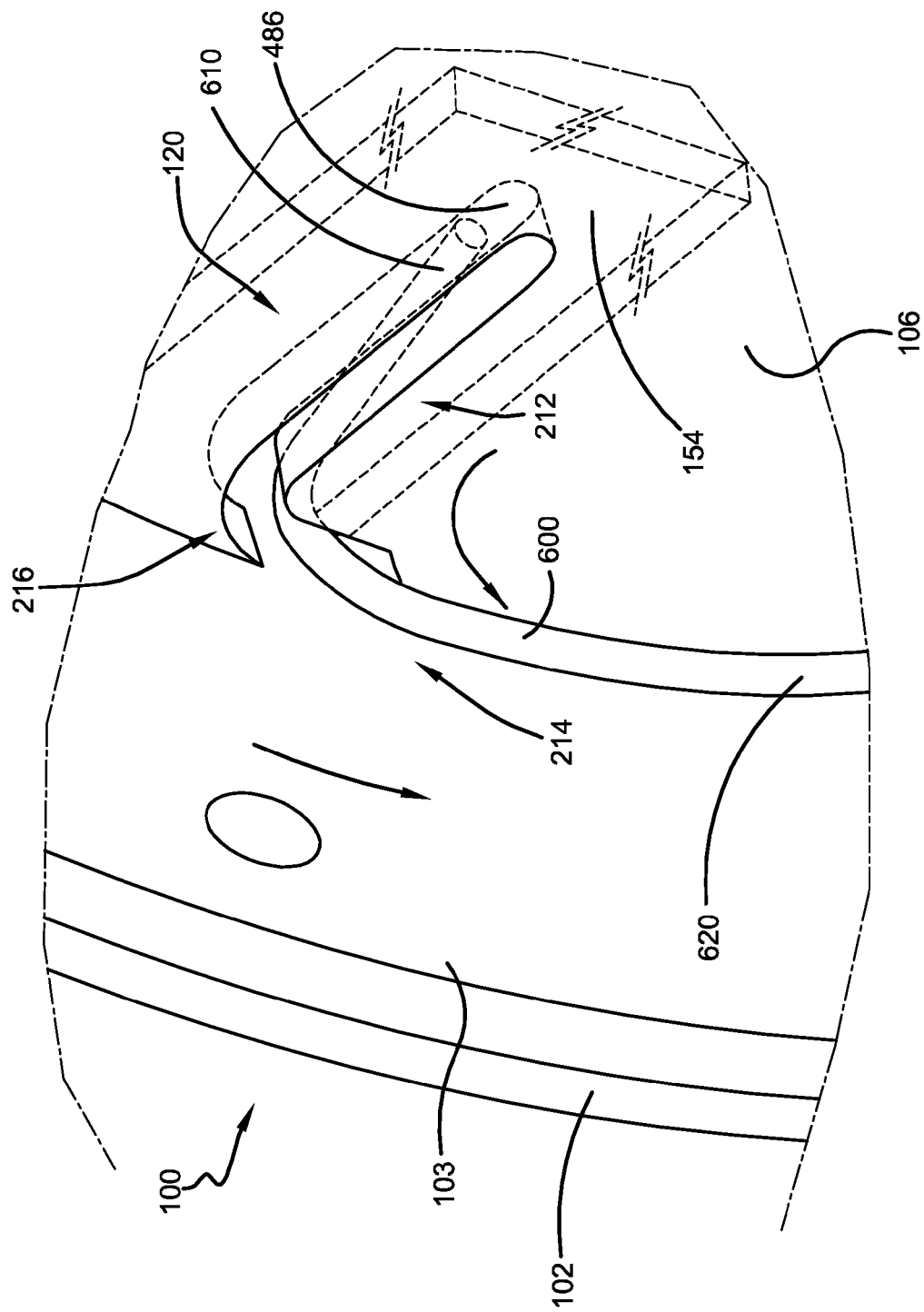
FIG. 7 is a perspective view of the hook slot employed to retain a start end of a welding wire within a spool key, which shows insertion of the welding wire following FIG. 6.

At the opposite end of the straight segment 212 from the end wall 448, is a transition inner wall 442 and transition outer wall 422 which defines an interior and exterior side of the transition, respectively. The distance between the transition outer wall 422 and the transition inner wall 442 can be substantially similar to the width between straight segment sidewalls 444 and 446 as shown. In an embodiment, a start end is disposed underneath the straight segment within the void 486. The length of wire to be wound 620 is drawn out in an opposite direction from the void 486 and wraps against the transition inner wall 442 before it is directed upward and against the inner face of the first flange 102 via the exit pocket 214, as shown in FIGS. 6 and 7. In other embodiments, the length of wire to be wound 620 does not contact the transition inner wall 442 before it is directed upward and out of the hook slot 120 via the exit pocket 214.

The exit pocket 214 can include one or more angled stepwise features that are utilized to direct a length of wire to be wound out of the hook slot and against an inner wall of a flange. The stepwise features together comprise a ramp that allows the wire to rise out of the hook slot at an angle that is generally aligned with the spring force of the wire. In this manner, wire can be accurately and repeatedly placed on the winding surface of the spool for precision winding operations. For this purpose, a transition landing 426 has a slight upward angle from the floor 468. The transition landing 426 is utilized to couple the floor 468 to an exit landing wall 428, which rises upward from the transition landing 426 to an exit landing 452. The exit landing 452 has an upward angle which is slightly greater than the transition landing 426. An exit sidewall 424 is disposed alongside the transition landing 426, exit landing wall 428, and exit landing 452. In an embodiment, the exit sidewall 424 is an inner face of the flange. Alternatively, the exit sidewall 424 is molded, milled, cut, or otherwise created at a location inward on the barrel 106 from the inner face of the flange.

A tapered wall 458 is disposed adjacent the transition inner wall 442 to guide a length of wire to be wound away from the centerline B and toward the inner face of the flange 102. It is to be appreciated that the length of the transition inner wall as it compares to the length of the tapered wall can vary to accommodate varying wire thicknesses. For example, in some instances, the length of the tapered wall 458 can be greater to direct the wire against the inner face of the flange at an earlier point within the hook slot. Alternatively or in addition, the angle of the tapered wall can vary commensurate with one or more factors, including wire gauge, wire coating, and spool and/or flange material. As shown in FIG. 7, once the length of wire to be wound 620 exits the exit landing, the exit sidewall 424 and tapered wall 458 converge toward an exit point 416, thereby directing the wire in an accurate and repeatable location against the inner face of the flange to facilitate a precision winding processes.

Using the subject embodiments, a start end 610 of the wire 600 is bent into a hook and manipulated into a hollow recess of a plastic key and, when hooked, the wire is completely contained within the molded plastic spool structure. This affords complete protection against shorting and eliminates the need for the weld setup personnel to manipulate the wire attempting to prevent said shorting. Also, because a hook larger than conventional size can be used, the start end 610 is securely disposed within the hollow recess. In this manner, less wire is left on the spool to scrap without concern about undesired displacement of the end before the weld is completed. In addition, in winding operations to place wire onto the spool barrel, a significant labor efficiency is gained at the onset of winding due to the wire positioning afforded by the angled exit face. Additionally, the coring of the key to create the hollow also represents proper mold design practice, through improved cooling in the mold, improved dimensional stability, and ultimately, a material savings.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

What is claimed is:

1. A wire spool, comprising:
    an elongate barrel having a longitudinal rotational axis, the barrel has a first end and a second end that are separated by a wall with an inner surface and an outer surface;
    a first flange that is toroidally shaped and is substantially orthogonal to the longitudinal rotational axis, the first flange is disposed concentrically surrounding the first end of the barrel;
    a second flange that is toroidally shaped and is substantially orthogonal to the longitudinal rotational axis, the second flange is disposed concentrically surrounding the second end of the barrel;
    a key that is disposed on the inner surface of the barrel, the key is a rectangular prism that extends from the second flange toward the first flange along the longitudinal rotational axis;
    a recess that creates a hole shaped as a rectangular prism within the key, the recess is smaller than the key;
    a hook slot that is disposed within the outer surface of the barrel, the hook slot is located above the recess and receives a wire with a start end and a length of wire to be wound, the hook slot includes,
        a straight segment that directs the start end into the recess in a first direction;
        a transition that receives the length of wire to be wound from the straight segment and directs the length of wire to be wound approximately ninety degrees relative to the first direction, the length of wire to be wound is opposite the start end; and an exit pocket that receives the length of wire to be wound from the transition and directs the length of wire to be wound out of the hook slot and against the second flange.

2. The wire spool of claim 1, the straight segment further including:
a first straight segment side wall;
a second straight segment sidewall; and
a floor disposed between the first straight segment sidewall and the second straight segment sidewall;
wherein the first straight segment sidewall and the second straight segment sidewall are substantially parallel to each other and are each substantially perpendicular to the floor.

3. The wire spool of claim 2, wherein the length of the first straight segment sidewall and the second straight segment sidewall is greater than the length of the floor.

4. The wire spool of claim 2, the straight segment further including:
a void that is adjacent the floor on a side opposite the transition, the void mechanically connects the hook slot to the recess.

5. The wire spool of claim 2, further including:
a transition inner wall;
a transition outer wall; and
a transition landing disposed between the transition inner wall and the transition outer wall, the transition inner wall and transition outer wall are separated at a distance that is equal to or greater than the distance between the first straight segment sidewall and the second straight segment sidewall.

6. The wire spool of claim 5, wherein a radius of the transition inner wall is 0.05 to 2.0 inches.

7. The wire spool of claim 5, wherein an angle of the transition inner wall is substantially the same as an angle of the transition outer wall.

8. The wire spool of claim 7, the exit pocket further including:
an exit landing wall, which extends upward from the transition landing; and
an exit landing, which is angled in an upward direction to guide the length of wire to be wound out of the hook slot.

9. The wire spool of claim 8, further including:
a tapered wall disposed adjacent the transition inner wall and opposite an exit sidewall, thereby defining the exit landing, the tapered wall angles toward the exit sidewall to create an exit point which is directly against the flange.

10. The wire spool of claim 1, wherein the hook slot receives a wire with a hook end that is bent at approximately ninety degrees.

11. A spool that is used to wind a wire with a start end and a length of wire to be wound, comprising:
an elongate barrel having a longitudinal rotational axis, the barrel has a first end and a second end that are separated by a wall with an inner surface and an outer surface;
a first flange that is toroidally shaped and is substantially orthogonal to the longitudinal rotational axis, the first flange is disposed concentrically surrounding the first end of the barrel;
a second flange that is toroidally shaped and is substantially orthogonal to the longitudinal rotational axis, the second flange is disposed concentrically surrounding the second end of the barrel;
a key that is disposed on the inner surface of the barrel, the key is a rectangular prism that extends from the second flange toward the first flange along the longitudinal rotational axis, the key has a key length along the longitudinal rotational axis;
a recess that creates a hole shaped as a rectangular prism within the key, the recess is smaller than the key, the recess has a recess length along the longitudinal rotational axis;
a hook slot that is disposed within the outer surface of the barrel, the hook slot is located above the recess and has a hook slot length along the longitudinal rotational axis, the hook slot includes,
a straight segment that directs the start end of the wire into the recess in a first direction;
a transition that receives the length of wire to be wound from the straight segment and directs the length of wire to be wound approximately ninety degrees relative to the first direction, the length of wire to be wound is opposite the start end; and
an exit pocket that receives the length of wire to be wound from the transition and directs the length of wire to be wound out of the hook slot and against the second flange,
wherein the key length is greater than the recess length and wherein the recess length is greater than the hook slot length.

12. The spool of claim 11, wherein the straight segment is orientated substantially orthogonally to the exit pocket.

13. The spool of claim 11, the exit pocket further including:
an exit sidewall proximate to the second flange, the exit sidewall connects the transition to an exit point; and
a tapered wall disposed opposite the exit sidewall that connects the transition to the exit point, the wall tapers toward the exit point as it moves from the transition toward the exit point to direct the length of wire to be wound out of the hook slot and against the second flange.

14. The spool of claim 13, further including:
an exit landing that is disposed between the exit sidewall and the tapered wall, the exit landing is angled upward to direct the length of wire to be wound upward and out of the hook slot.

15. A hook slot disposed within a barrel of a wire spool, the barrel has an exterior surface and an interior surface, comprising:
a recess which is disposed between the exterior surface and the interior surface of the barrel;
a straight segment that receives a start end and a length of wire to be wound, the straight segment includes:
a first straight segment sidewall;
a second straight segment sidewall that is substantially parallel to the first straight segment sidewall;
a floor that is disposed between the first straight segment sidewall and the second straight segment sidewall; and
a void, which is disposed adjacent to the floor to mechanically couple the straight segment to the recess, wherein the start end is directed into the recess via the void in a first direction;
a transition that receives the length of wire to be wound from the straight segment, the transition directs the length of wire to be wound approximately ninety degrees relative to the first direction; and
an exit pocket that receives the length of wire to be wound from the transition and directs the length of wire to be wound out of the hook slot; wherein the distance of the hook slot from the flange to an end wall of the hook slot is less than the distance of the flange to an end wall of the recess; and a key which encloses the recess, the key is disposed on the interior surface of the barrel.

16. The hook slot of claim 15, wherein the hook slot is disposed adjacent a flange on the spool.

17. The hook slot of claim 16, wherein the exit pocket is employed to direct the length of wire to be wound out of the hook slot and against the flange.

* * * * *